United States Patent [19]

Fujii et al.

[11] Patent Number: 4,863,794

[45] Date of Patent: Sep. 5, 1989

[54] GLASSFIBER REINFORCED FLUOROCARBON POLYMER COATING COMPOSITION FOR METAL SURFACES, PROCESS OF PREPARING THE SAME, AND METAL SHEETS COATED WITH SUCH COATING COMPOSITION

[75] Inventors: Haruki Fujii; Isao Miyawaki, both of Hyogo; Motoomi Sakai, Osaka; Fumio Kanazawa, Osaka; Tadahiko Watanabe, Osaka, all of Japan

[73] Assignees: Daido Steel Sheet Corporation, Hyogo; Dainippon Ink & Chemicals, Inc., Tokyo, both of Japan

[21] Appl. No.: 110,292

[22] Filed: Oct. 20, 1987

[51] Int. Cl.$^4$ .................. B32B 5/16; B32B 15/08; B32B 17/10; C08K 9/06

[52] U.S. Cl. .................. 428/325; 148/403; 427/407.2; 428/421; 428/432; 428/463; 523/214

[58] Field of Search ............... 428/463, 290, 432, 421; 427/40.2; 148/403; 523/214

[56] References Cited

U.S. PATENT DOCUMENTS 4,749,610 6/1988 Katsuragawa et al. ........ 428/421 X
4,749,625 6/1988 Obayashi et al. ............... 428/463 X

FOREIGN PATENT DOCUMENTS 51-8128 3/1975 Japan.
50-25485 8/1975 Japan.
57-177379 11/1982 Japan.

*Primary Examiner*—Thomas J. Herbert
*Attorney, Agent, or Firm*—Armstrong, Nikaido, Marmelstein, Kubovcik & Murray

[57] ABSTRACT

A novel fluorocarbon polymer coating composition in which glass fibers are successfully dispersed to add enhanced scratch and wear resistances to the superior properties inherent to the fluorocarbon polymer. The glass fibers are firstly sized with a solution of a titanate coupling agent and subsequently sized with a solution of a silane coupling agent. With this composite sizing treatment, the glass fibers can have greatly improved wettability or compatibility with the fluorocarbon polymer coating composition so that they can be substantially randomly dispersed in the coating composition, whereby the fluorocarbon polymer coating can have the combined superior properties resulting from the use of the fluorocarbon polymer and the incorporation of the glass fibers.

13 Claims, No Drawings

GLASSFIBER REINFORCED FLUOROCARBON POLYMER COATING COMPOSITION FOR METAL SURFACES, PROCESS OF PREPARING THE SAME, AND METAL SHEETS COATED WITH SUCH COATING COMPOSITION

FIELD OF THE INVENTION

The present invention is directed to a glass fiber reinforced fluorocarbon polymer coating composition, a process of preparing the same, and a metal sheet coated with such coating composition. More particularly, the invention is directed to the fluorocarbon polymer coating suitable for galvanized steel sheets, aluminum-zinc alloy plated steel sheets, aluminum sheet, and stainless steel sheets.

BACKGROUND OF THE INVENTION

Metal sheets coated with fluorocarbon polymer coatings have been widely utilized as roofing, siding, and the like building materials because of the superior physical and chemical properties that the fluorocarbon polymer coatings exhibits. Such properties include weatherability, corrosion resistance, chemical resistance, contamination resistance, and heat resistance. However, for economy reasons, the use of the fluorocarbon polymers on the metal surfaces places severely limitation upon the coating thickness as thin as 20 to 30 $\mu$. The reduced thickness of the fluorocarbon coating poses a serious problem that it is likely to be damaged by being subject to friction impact or scraped when the blank sheet with such coating is processed by roll- or press-forming into roofing and siding materials. Further with such limited thickness of the fluorocarbon polymer coating water is easy to penetrate through the coating to reach the metal surface. For example, when the sheet metal is zinc plated, the solution of zinc ions occurs in the presence of moisture entering beneath the coating so as to resulting in the corrosion of the sheet. In order to avoid this corrosion in the deposited steel sheet, it is possible to give a deposition layer or plating of increased thickness. But, this attempt is found to be totally unsatisfactory since the increased thickness of the deposition will easily crack during the process of bending the sheet with a roll- or press-forming press, which in turn breaks the coating, thus causing the bent section of the sheet to suffer from unacceptably lowered corrosion resistance which may cause pitting corrosion. This is true of the steel sheets with zinc plating or aluminum-zinc alloy plating.

In the meanwhile it has been proposed, as in Japanese Patent Publications No. 50-24585 for "precoated steel sheet" and No. 51-8128 for "glass flakes containing coating composition for steel sheet", to disperse into coating compositions E-glass or C-glass in the form of flakes, beads, and preferably fibers so as to increase the strength and hardness of the coating for improving scratch and wear resistance. The technique proposed in the patents is found also effective in that the incorporated glass serves as a filler to reduce the cost.

Accordingly, the fluorocarbon polymer coating composition can be expected to have improved scratch and wear resistance by the incorporation of the glass fibers, in addition to its inherent superior properties. However, the mere addition of the glass fibers into the fluorocarbon polymer coating compositions does not realize the expected results but rather lowers the properties of the fluorocarbon polymer due to the presence of the hydrophilic groups such as OH-around the surfaces of the glass fibers. That is, the hydrophilic groups adversely act to reduce the wetting of the glass fibers and therefore make the same less compatible with the fluorocarbon polymer coating composition, making it difficult to disperse the glass fibers uniformly in the coating composition. Thus, the resulting coating will suffer from being porous which eventually allows outside water to easily penetrate through the coating, resulting in low adhesion between the coating and the substrate and further expediting the solution of metal ions or corrosion of the substrate.

Although it is widely known for polyester resin coating composition to improve the compatibility of the glass fibers with the coating composition by sizing the glass fibers with a suitable silane coupling agent, this sizing technique is found unfortunately to be totally ineffective for the fluorocarbon polymer coating composition since it never improves the wetting of the glass fibers, as taught in the unexamined publication (KOKAI) No. 57-177379 of Japanese patent application for "process for coated steel sheet of improved durability".

To overcome this problem, the above patent adopts the technique of utilizing the glass fibers together with the fluorocarbon polymer coating. The technique comprises the steps of forming on the metal sheet a first prime coat of epoxy resin, forming on the first primer coat a second prime coat of high polymer epoxy resin containing therein glass fibers sized with a silane coupling agent and which exhibits a good adhesion strength to the first prime coat as well as a fluorocarbon polymer to be used as a finish coat, and then forming on the second epoxy prime coat the finish coat of the fluorocarbon polymer. However, this technique is rather complicated as it had to repeat three coating steps of forming the layers, i.e., the epoxy coating, high polymer epoxy coating, and then the fluorocarbon coating, which makes it less practical and economical in the field of the metal sheet coating.

SUMMARY OF THE INVENTION

In view of the above shortcomings, the present invention has been accomplished and provides first of all a novel glass fiber reinforced fluorocarbon polymer coating composition which forms on metal surfaces a coating capable of combining superior properties resulting from the use of the fluorocarbon polymer coating composition as well as the incorporation of the glass fibers.

Accordingly, it is a primary object of the present invention to provide a glass fiber reinforced fluorocarbon polymer coating composition which assures the coating on metal surfaces to have improved physical and chemical properties in weather, corrosion, chemical, contamination, and heat resistances, yet in scratch and wear resistances.

The coating composition of the present invention comprises a fluorocarbon polymer coating solution containing therein glass fibers which are prepared through the process of firstly treating the glass fiber with a first sizing solution of a titanate coupling agent and thereafter treating thus-sized glass fibers again with a second sizing solution of a silane coupling agent. The glass fibers treated with the titanate and silane coupling agents are found to have an enhanced wetting and compatibility with the fluorocarbon polymer coating composition. Thus, the glass fibers can be well prevented from settling in the coating composition and therefore can be dispersed substantially randomly in the coating composition, assuring the above superior properties. Although it is not clear at this time as to why the unexpected result is obtained by the present invention, the composite sizing by the titanate and silane coupling agents are found by the inventors to account for the improved wetting and compatibility of the glassfibers with the fluorocarbon polymer solution.

The sizing treatment in this sequence is essential for obtaining the above effect since the sizing treatment in the reverse order or the sizing treatment of simultaneously sizing the glass fibers with the composite solution of the titanate and silane coupling agents cause the silane coupling agent to predominantly cover substantially the entire surfaces of the glass fibers, failing to combine the titanate coupling agent to the glass fibers.

It is therefore another object of the present invention to provide a process of preparing the glass fiber reinforced fluorocarbon polymer coating composition in which the glass fibers are firstly sized with the solution of a titanate coupling agent and thereafter sized with the solution of a silane coupling agent so as to successfully size the glass fibers with the titanate and silane coupling agent for improving the compatibility thereof.

The present invention also discloses a metal sheet coated with the glass fiber reinforced fluorocarbon polymer coating composition. The metal sheet comprises a prime coat of an epoxy resin on a metal sheet and an outer coat formed from a glass fiber reinforced fluorocarbon polymer coating composition. The epoxy resin prime coat acts as an effective binder between the metal substrate and the fluorocarbon polymer coating. When a metal sheet with a zinc containing deposition layer, for example, zinc plated metal sheet or aluminum-zinc alloy plated metal sheet is utilized, the epoxy resin prime coat is required to incorporate therein as an anticorrosive a suitable chromate in order to prevent the zinc atoms in the deposition layer from being attacked in corrosive environments which would otherwise be the cause of blistering the outer coat. The chromate includes, for example, strontium chromate and calcium chromate. Effective amount of the chromate to be incorporated into the solution of the epoxy resin prime coat for aluminum-zinc plated sheets is found to be between 15 to 60 % by weight.

DESCRIPTION OF THE INVENTION

The glass-reinforced fluorocarbon polymer coating composition in accordance with the present invention can be adapted on metal sheets including a steel sheet plated or galvanized with zinc, a steel sheet plated with aluminum-zinc alloy, an aluminum sheet, a stainless steel sheet, and the like.

The coating composition into which the glass fibers are added is prepared in the form of a solution of a fluorocarbon polymer with a suitable pigment in a solvent such as ketone and/or aromatic hydrocarbon. The fluorocarbon polymers which can be utilized in the coating composition include polyvinylidenfluoride, polyvinylfluoride, tetrafluoroethylene-hexafluoropropene copolymer, vinylidenfluoride-hexafluoropropene copolymer, tetrafluoroethylene-propylene copolymer, and solvent solve fluoroolefine copolymer with hydroxyl group.

Glass fibers to be dispersed in the fluorocarbon polymer coating composition may be of E-glass or C-glass in the form of chopped strand or filament, although they are not limited thereto. Preferably, the glass fiber has a diameter of 1 to 30 $\mu$ and a length of 1 to 200 $\mu$ for the reasons below. In consideration of that the fluorocarbon polymer coating is normally expected to have a reduced thickness as less as 20 to 30$\mu$ from economic standpoints, the glass fibers having the diameter over 30$\mu$ are likely to be exposed on the coating surface, making the coating susceptible to cracking at the time of processing the coated sheet into a desired shape as well as rendering the glass fibers to be easily separated from the coating. The glass fibers having a length over 200 $\mu$ are difficult to be uniformly or randomly dispersed in the coating composition. While the glass fibers of less than 1 $\mu$ in diameter or length are not expected to give the desired reinforcing effect.

The amount of the glass fibers incorporated in the coating composition is preferably between 1 and 60 parts by weight based upon 100 parts of the coating composition. Above 60 parts, the resulting coating will suffer considerably low elongation which is not acceptable in the process of bending the finished metal sheet. Below 1 parts of glass fibers, the resulting coating will exhibit no substantial reinforcing effect of increasing the hardness and scratch resistance.

Prior to incorporating the glass fibers in the fluorocarbon polymer coating composition, the glass fibers are sized firstly by a titanate coupling agent and thereafter by a silane coupling agent in order to enhance the wetting and compatibility with the fluorocarbon polymer coating composition. Representative of the titanate coupling agents are:
isopropyl triisostearoyl titanate,
diisostearoyl ethylene titanate,
isopropyl trimethacryl titanate,
titanium dimethacrylate oxyacetate,
isopropyl triacryl titanate,
titanium diacrylate oxyacetate,
isopropyl tricumylphenyl titanate,
titanium di(cumylphenolate) oxyacetate,
isopropyl tri(N ethylamino-ethylamino) titanate,
isopropyl tri(2-aminobenzoyl) titanate,
isopropyl tri(tetraethylenetriamine) titanate,
isopropyl tri(3-mercaptopropionyl) titanate,
isopropyl triricinoyl titanate,
isopropyl tridodecylbenzenesulfonyl titanate,
isopropyl tri(dioctylphosphato) titanate,
titanium di(dioctylphosphate) oxyacetate,
di(dioctylphosphato)ethylene titanate,
isopropyl tri(dioctylpyrophosphato) titanate,
titanium di(dioctylpyrophosphate) oxyacetate,
di(dioctylpyrophosphato)ethylene titanate,
tri(butyl octyl pyrophosphato)isopropyl titanate mono(dioctyl hydrogen phosphite),
titanium di(butyl octyl pyrophosphate)di(dioctyl hydrogen phosphite) oxyacetate,
di(butyl methyl pyrophosphato) isopropyl titanate mono(dioctyl hydrogen) phosphite,
di(butyl, methyl pyrophosphato)ethylene titanate mono(dioctyl hydrogen phosphate),
tetraisopropyl di(tridecylphosphito) titanate,
tetraisopropyl di(dioctylphosphito) titanate,
tetraoctyloxytitanium di(ditridecy-1phosphite), and
tetra(2,2 diallyloxymethyl-1 butoxy titanium di(di-tridecyl) phosphite.

Representative of the silane coupling agents are:
vinyltriethoxy silane,
vinyltri(beta-methoxy-ethoxy) silane,
gamma-glycidoxypropyltrimethoxy silane, gamma-methacryloxypropyltrimethoxy silane,
gamma-mercaptopropyltrimethoxy silane,
gamma- chloropropyltrimethoxy silane,
beta-(3.4-epoxycyclohexyl)-ethyltrimethoxy silane,
N-beta(aminoethyl-gamma-aminopropyltrimethoxy silane, and
gamma-aminopropyltriethoxy silane.

The process of providing the composite sizing on the glass fibers will be explained below. A first solution of the titanate coupling gent is prepared by adding the titanate coupling agent to a suitable solvent such as ketone, ester, aromatic hydrocarbon, alcohol, and ether. A preferred solvent is the mixture of one of ketone, ester, and hydrocarbon with one of alcohol and ether in the equal amount. Preferably, 0.01 to 20 parts by weight of the titanate coupling agents is added to 100 parts by weight of the mixed solvent followed by being stirred for 1 to 10 minutes at a temperature of 5° to 40° C. using a stirrer rotating at 1200 to 1500 rpm. In the following description, all parts and percentages are on a weight basis. The glass fibers are then added bit by bit to thus prepared first solution with stirring. The resulting mixture is heated with stirring to evaporate the solvent so to obtain the dry glass fiber sized with the titanate coupling agent. Preferably, 1 to 60 parts of the glass fibers are added to 100 parts of the solution of titanate coupling agent, and the evaporation of the solvent is made at a temperature of 30° to 50° C. for 5 to 30 minutes with stirring at 1200 to 1500 rpm. After sized with the titanate coupling agent, the glass fibers are further treated with a second solution of the silane coupling agent. The second solution is prepared by adding the silane coupling agent to the same solvent as in the above first solution. Preferably the second solution is prepared by adding 0.01 to 10 parts of the silane coupling agent to 100 parts of the solvent followed by being stirred for 1 to 10 minutes at a temperature of 5° to 40° C. using a stirrer rotating at 1200 to 1500 rpm. Then the glass fibers presized with the titanate coupling agent are added bit by bit to the second solution with stirring. The resulting mixture is heated to a temperature of 30° to 50° C. and stirred for 5 to 40 minutes while being continuously stirred at 1200 to 1500 rpm in order to evaporate the solvent and obtain the dry the glass fibers sized twice by the titanate and silane coupling agent.

The resulting glass fibers are blended in the solution of fluorocarbon polymer and stirred to prepare the glass fibers reinforced fluorocarbon polymer coating composition in which the glass fibers are dispersed uniformly owing to the enhanced wettability and compatibility resulting from the composite sizing of the glass fibers with the titanate and silane coupling agents.

It should be noted at this time that the enhanced wettability and compatibility can be only obtained when sizing the glass fibers firstly with the titanate coupling agent and then with the silane coupling agent, and never obtained when they are sized in the reverse order nor sized with the composite solution of the titanate and silane coupling agents. In the latter two cases, the silane coupling agent predominates to cover substantially entire surface of the glass fiber, leaving no substantial surface for the titanate coupling agent and therefore failing to adhere the titanate coupling agent to the glass fiber. On the contrary, according to the present invention in which the glass fibers are firstly sized with the titanate coupling agent and then with the silane coupling agent, the silane coupling agent is adhered to the portion left unsized with the titanate coupling agent so that the glass fiber can have its surface successfully sized with both of the titanate and silane coupling agents, which composite sizing is found to be responsible for the enhanced wettability and the compatibility with the fluorocarbon polymer coating compositions.

The fluorocarbon polymer coating composition, in which the particularly sized glass fibers are dispersed, can well prevent the settling of the glassfibers in the coating composition as well as lower the thixotropy thereof in the coating process because of the enhanced wettability of the glass fibers with the coating composition, enabling to present a uniform and smooth coating on metal surfaces. With this effect, the coating can have increased strength and hardness by the presence of the glass fibers without raising water permeability and without impairing any properties inherent to the fluorocarbon polymer coating. It is also noted that the silane coupling agent acts to improve corrosion resistance particularly at the planar area of the metal substrate while the titanate coupling agent improves corrosion resistance particularly at the edge section of the substrate. For confirmation of the reduced water permeability and enhanced strength of the resulting coating, the test was conducted to compare the fluorocarbon polymer coating containing the glass fibers with the same composition but containing no glass fibers. Each coating was formed to have a coating thickness of $25\mu$. The coating with glass fibers shows a water permeability of 260 to 420 $g/m^2$.day at 50° C. and 40 to 47% RH, and a tensile strength of 295 to 340 $Kg/cm^2$ against a pull of 50 mm/minutes, while the coating without the glass fibers have a water permeability of 460 $gm/m^2$.day and a tensile strength of 290 $Kg/cm^2$. Thus, it is proved that the glass fiber reinforced fluorocarbon polymer coating is superior to the coating without the glass fiber in the above properties.

The following examples and comparative examples show the comparative results, with and without the compositely sized glass fibers, for a fluorocarbon polymer coating composition, but it is to be understood that these examples are given by way of illustration and not of limitation. All parts and percents are on a weight basis.

EXAMPLE 1

5 parts of isopropyl triisostearoyl titanate was dissolved in 100 parts of a mixture solvent of MEK and diethyl ether in an equal amount followed by being stirred for 3 minutes at 25° C. using a stirrer rotating at 1300 rpm to form a first solution of the titanate coupling agent.

20 parts of glass fibers having a length of 20 to 50 $\mu$ and a diameter of 13 $\mu$ were mixed bit by bit to 100 parts of the first solution with stirring at 1300 rpm for 15 minutes at 40° C. The mixture was then heated to evaporate the solvent to obtain the glass fiber sized with titanate coupling agent.

2 parts of vinyltriethoxy silane was dissolved in 100 part of the same solvent mixture as used in the first solution with stirring at 1300 rpm for 3 minutes at 25° C. to form a second solution of the silane coupling agent.

The glass fibers presized with the titanate coupling agent were mixed bit by bit to the second solution with stirring at 1300 rpm for 15 minutes at 40° C. Thereafter, the mixture was heated to evaporate the solvent to obtain the glass fiber sized with the titanate coupling agent and with the silane coupling agent. 20 parts of the glass fibers thus sized were blended with 100 parts of a fluorocarbon polymer coating composition [manufactured by Dainippon Ink & Chemicals Inc., Japan and designated F-18], which is a solution of polyvinylidenfluoride in a solvent mixture of isophoron, xylene, and MEK and which additionally includes as pigments titanium oxide and iron oxide. The solution was stirred at 1300 rpm for 20 minutes at 35° C. to prepare a brownish glass fiber containing fluorocarbon polymer coating composition [hereinafter referred to as F-18G].

The resulting coating composition [F18-G] was then coated on a 0.4 mm thick zinc plated steel sheet as specified by the Japanese Industrial Standards [JIS] as Z27. Prior to the coating, the sheet was chemically treated by a solution of zinc phosphate [available from Japan Parker Industry Inc. as BT 3310] followed by being formed thereon with an epoxy resin prime coat of 5 $\mu$ in dry thickness. The prime coat was obtained by coating a primer composition [available from Dainippon Ink & Chemicals Inc. as No. 23-P], which is a solution of bisphenol-A epoxy resin including 10% by weight of chromate, and baking for 35 seconds at a maximum sheet temperature of 180° C. Thereafter, the coating composition [F18-G] was coated on the epoxy prime coat and baked for 50 seconds at a maximum sheet temperature of 240° C. to present a glass fiber reinforced fluorocarbon polymer coating of 25 $\mu$ in dry thickness on the zinc plated sheet steel.

EXAMPLE 2

A 0.4 mm thick zinc plated sheet [JIS Z27] was coated with the same glass fiber containing fluorocarbon polymer coating composition [F-18G] as prepared in Example 1. In this example, the epoxy prime coat was formed using instead of the above prime coat composition No. 23-P another prime coating composition No. 64-P (available from Dainippon Ink & Chemicals Inc.), which is a solution of bisphenol-A and containing 35% by weight of chromate as an anticorrosive. All other conditions are identical as in Example 1.

EXAMPLE 3

The same glass fiber contained fluorocarbon polymer coating composition [F-18G] as utilized Example 1 was coated on an aluminum-zinc alloy (55.0% Al - 43.4% Zn - 1.6% Si) plated steel sheet of 0.4 mm in thickness. Prior to the coating, the surface of the plated sheet was firstly treated with a chromating agent BT 1415A available from Nippon Parker Inc. followed by being formed with an epoxy resin prime coat of 5 $\mu$ in dry thickness. The epoxy resin prime coat was formed by coating the prime coat composition No. 64-P as used in Example 2 and by baking at a maximum sheet temperature of 180° C. for 35 seconds. The coating on the aluminum-zinc plated steel sheet was performed in the same manner and conditions as in Example 1 to obtain a glass fiber reinforced fluorocarbon coating on the aluminum-zinc plated steel sheet.

EXAMPLE 4

A 0.4 mm thick Al-Zn plated steel sheet was coated with the glass fiber containing fluorocarbon polymer coating composition [F-18G] in the same manner and conditions as in Example 3 except that the epoxy prime coat was formed from the prime coat composition No. 23-P containing 10% chromate.

EXAMPLE 5

A 0.8 mm thick aluminum sheet was coated with the glass fiber containing fluorocarbon coating composition [F-18G]. Prior to the coating, the aluminum sheet was pretreated with a solution of the chromating agent BT 1415A and then precoated with a solution of the prime coating composition No. 23-P to have a 5 $\mu$ thick prime coat thereon. The other conditions were same as in Example 1.

EXAMPLE 6

A 0.4 mm thick stainless steel sheet was coated with the glass fiber coating fluorocarbon coating composition [F-18G] in the same condition as in Example 5.

COMPARATIVE EXAMPLE 1

A 0.4 mm thick zinc plated steel sheet was coated in the same manner and conditions as in Example 1 but using the fluorocarbon polymer coating composition [F-18] without the glass fibers to present a fluorocarbon polymer coating of 25 $\mu$ in dry thickness on the zinc plated sheet steel.

COMPARATIVE EXAMPLE 2

A 0.4 mm thick Al-Zn plated steel sheet was coated with the fluorocarbon polymer coating composition [F-18] without the glass fibers. The other procedures and conditions were identical to those effected in Example 3.

COMPARATIVE EXAMPLE 3

A 0.4 thick Al-Zn plated steel sheet was coated with the fluorocarbon polymer coating composition [F-18] without the glass fibers in the same manner and conditions as in Example 3 except that a prime coat was formed from the prime coat composition No. 23-P containing 10% chromate.

The features of Examples and Comparative Examples are summarized in the following Table 1.

For evaluating and comparing purposes, standard tests have been conducted with respect to corrosive resistance, chemical resistance, wear resistance, workability, and other properties normally required for the coated metal sheet for each of the coated sheet of Examples and Comparative Examples. The test results are listed in Table 2.

TABLE 1

| | metal sheet used | plating material | chemical treatment | epoxy prime coat | finish coat |
|---|---|---|---|---|---|
| Example 1 | steel | Zn | BT3310 (phosphate) | No.23-P (10% chromate) | F-18G w/ glass fiber |
| Example 2 | steel | Zn | BT3310 (phosphate) | No.64-P (35% chromate) | F-18G w/ glass fiber |
| Example 3 | steel | Al—Zn | BT1415A (chromate) | No.64-P (35% chromate) | F-18G w/ glass fiber |
| Example 4 | steel | Al—Zn | BT1415A (chromate) | No.23-P (10% chromate) | F-18G w/ glass fiber |
| Example 5 | aluminum | none | BT1415A | No.23-P | F-18G |

TABLE 1-continued

|  | metal sheet used | plating material | chemical treatment | epoxy prime coat | finish coat |
|---|---|---|---|---|---|
| Example 6 | stainless steel | none | (chromate) BT1415A | (10% chromate) No.23-P | w/ glass fiber F-18G |
| Comparative Example 1 | steel | Zn | (chromate) BT3310 (phosphate) | (10% chromate) No.23-P (10% chromate) | w/ glass fiber F-18 w/o glass fiber |
| Comparative Example 2 | steel | Al—Zn | BT1415A (chromate) | No.64-P (35% chromate) | F-18 w/o glass fiber |
| Comparative Example 3 | steel | Al—Zn | BT1415A (chromate) | No.23-P (10% chromate) | F-18 w/o glass fiber |

TABLE 2

|  | Examples | | | | | | Comparative Examples | | |
|---|---|---|---|---|---|---|---|---|---|
|  | 1 | 2 | 3 | 4 | 5 | 6 | 1 | 2 | 3 |
| Corrosive Resistance | | | | | | | | | |
| Salt water resistance after 3000 hrs exposure | | | | | | | | | |
| (1) blistering (%) at plane section | 0 | 0 | 0 | 0 | 0 | 0 | 30–50 | 0 | 0 |
| (2) width (mm) of blistering at edge section | 1 | 2 | 0 | 2 | 0 | 0 | 4 | 1 | 2 |
| (3) width (mm) of blistering at diagonal cut lines | 3 | 3 | 2 | 7 | 0 | 0 | 5 | 4 | 15 |
| (4) blistering (%) at bend portion | 0 | 0 | 0 | 0 | 0 | 0 | 30–50 | 0 | 30–50 |
| Chemical Resistance at 25° C. for 150 hrs presence of blistering (%) | | | | | | | | | |
| 10% caustic soda | 0 | 0 | 0 | 0 | 0 | 0 | 0 | 0 | 0 |
| 10% sulfuric acid | 0 | 0 | 0 | 0 | 0 | 0 | 0 | 0 | 0 |
| 10% hydrochloric acid | 0 | 0 | 0 | 0 | 0 | 0 | 30–50 | 30–50 | 30–50 |
| Wear Resistance | | | | | | | | | |
| Pencil scratch hardness | 6H | 6H | 6H | 6H | 6H | 6H | H | H | H |
| Sutherland scratch hardness | 5 | 5 | 5 | 5 | 5 | 5 | 4 | 4 | 4 |
| Wear Resistance | | | | | | | | | |
| Coin Scratch hardness | 5 | 5 | 5 | 5 | 5 | 5 | 4 | 4 | 4 |
| Taber Abrasion resistance $(g/m^2)$ after 1000 cycles loss of weight | 8 | 9 | 8 | 8 | 8 | 8 | 17 | 16 | 16 |
| Workability | | | | | | | | | |
| Bending strength w/o crack (number of interleaving sheets) | 2 | 3 | 2 | 2 | 2 | 2 | 4 | 3 | 3 |
| Impact resistance presence of crack (%) | 0 | 0 | 0 | 0 | 0 | 0 | 0 | 0 | 0 |
| Secondary adhesion strength after 15 hrs boiling - bending strength w/o crack (number of interleaving sheets) | 2 | 3 | 2 | 2 | 2 | 2 | 4 | 3 | 3 |
| Others | | | | | | | | | |
| Water permeability $(Kg/m^2 \cdot day)$ 50° C. 40–47 % RH | 280 | 280 | 275 | 280 | 280 | 280 | 460 | 450 | 460 |
| Tensile Strength $(kg/cm^2)$ at a pull of 50 mm/min | 320 | 320 | 320 | 320 | 320 | 320 | 290 | 290 | 290 |
| Slip angle (degree) | 20 | 20 | 20 | 20 | 20 | 20 | 18 | 18 | 18 |

In the above tests, salt water resistance representative of corrosion resistance was observed after 3000 hrs exposure to salt water spray as specified in the Japanese Industrial Standards (herein after referred to as JIS) K 5400 & Z 2371. The resistance was measured for each specimen in terms of the ratio (%) of the area suffering blistering to the total surface area or the maximum width of the blistering appearing at (1) plane section, (2) edge section, (3) crossed diagonal lines cut through the coating to the metal substrate, and (4) bent portion of the specimen which was folded over with 4 sheets of 0.4μ thick steel sheets interleaved pressedly therebetween.

In the determination of chemical resistance, each specimen was immersed for 150 hrs in each of the chemicals of the listed concentration maintained at 25° C. with the edges of the specimen sealed against the chemical, and thereafter the chemical resistance was measured for each specimen in terms of the ratio (%) of the blistering area to the total.

Pencil scratch hardness was determined according to the test procedure specified by JIS D0202 8.10 in which a pencil held at an angled of 45° to the plane of each specimen was pushed across the coating for attempting to scratch it so as to determine the hardness of the coating in terms of the hardness of the pencil capable of leaving the scratch in the coating. The pencils utilized are those sold under the tradename of "MITSUBISHI UNI".

Sutherland scratch hardness was determined based upon the test procedure as specified by JIS K 5701 except that an coated sheet steel was utilized as a substitute for an abrasion paper to rub the coating of each specimen for 50 cycles. The result was evaluated on a grade scale of 5 (five) in which 5 stands for no appreciable surface abrasion found, 4 for slight abrasion, 3 for some abrasion, 2 for considerable abrasion, 1 for numerous abrasion.

Coin scratch hardness was determined by scratching the coating by pulling 10-yen coin at an angle of about 45° across the coating. The result was evaluated on a grade scale of 5 (five) in which 5 stands for no scratch line reaching the substrate, 4 for about 10%, 3 for about 30%, 2 for about 70%, and 1 for about 100% of the scratch lines reaching the substrate.

Taber abrasion resistance was determined by the test procedure as specified in JIS K-6902 using of CS-17 abrasion wheels available from Teledyne Taber, USA and rotating the wheels for 1000 cycles with 1 Kg weight applied on the abraser arms. The values in the Table 1 express the weight loss of the coating per unit area ($mg/m^2$).

Bending strength was determined to be the minimum number of 0.4 $\mu$ thick steel sheets which can be interposed pressedly between the folded specimen without causing any crack in the coating of the folded specimen.

Impact resistance was determined by the test procedure as specified in JIS K-5400 6.13.3 (Impact deformation test) to observe crack appearing in the coating of each specimen after dropping an impact tool of 0.5 inch in diameter to the coating from a height of 50 cm with the load of 1 Kg. The result was evaluated in terms of the ratio (%) of the area suffering the cracks to the total surface area.

In determining secondary adhesion strength, each specimen was immersed in boiling water for 15 hours and removed therefrom to be left for 1 hours at an ambient temperature. Then it was folded over with a suitable number of 0.4 $\mu$ thick steel sheets interleaved therebetween in order to determine the secondary adhesion strength to be a minimum number of the sheets which can be interleaved without causing any crack in the coating of the specimen.

Water permeability was determined to be an evaporation loss of water per unit area per day ($g/m^2$.day) and was obtained in the following procedure. 25 mm diameter petri dishes containing 3 ml of distilled water were each sealed by each of the coating compositions and placed in a thermohygrostat to be maintained at 50° C. and 40 to 47 RH % for 96 hours. After removing from the thermohygrostat, each dish was left within a desiccator for 30 minutes in order to calculate the evaporation loss of the water.

Tensile strength was measured according to the test procedure specified in JIS K-7113 and using the Instron universal tension tester with a pull speed of 50 mm/min. The result was expressed by the rapture load per unit area ($kg/cm^2$).

Slip angle was determined to be an angle of the coated sheet of each specimen with respect to horizontal at which a 200 g load object carried on the coating started to slip downward. In this test, the sheet was gradually raised at a speed of 8 mm/sec.

As apparent from the test results in Table 2, it is found that the fiber glass reinforced fluorocarbon polymer coating on the metal sheet exhibit greatly improved properties in wear resistance, workability and the mechanical strength, yet assuring superior corrosive and chemical resistances more than expected in the fluorocarbon polymer coating composition without the glass fibers.

Further, as is clearly understood from comparison between Examples 3 and 4 with respect to corrosive resistance at the edge section (2) and the diagonal cut lines (3), when the Al-Zn plated steel sheet is utilized as the metal substrate, the prime coat is preferred to contain more amount of chromate for effectively inhibiting the corrosion. That is, the addition of more amount of chromate in the epoxy resin prime coat is found to well overcome the disadvantage, i.e., poor electrochemical property that the aluminum-zinc plated steel sheet inherently suffer and that will easily cause the zinc atoms to be attacked in a corrosive environment and therefore leading to the blistering in the finished coating.

Preferably, the addition of 15 to 60 parts by weight of the chromate anticorrosive agent to the prime coating composition is effective for inhibiting the corrosion, particularly at the edge section and the scratched section of the coating.

What is claimed is:

1. Metal sheet coated with fluorocarbon polymer coating comprising:
    a metal sheet formed with a prime coat of an epoxy resin; and
    an outer coat on said prime coat, said outer coat being formed from a fluorocarbon polymer coating composition in which glass fibers are dispersed substantially randomly therein, said coating composition consisting essentially of a solution of a fluorocarbon polymer, and said glass fibers being prepared through the process of firstly treating said glass fiber with a first sizing solution of a titanate coupling agent and subsequently treating thus-sized glass fibers with a second sizing solution of a silane coupling agent.

2. Metal sheet coated with fluorocarbon polymer coating composition as set forth in claim 1, wherein said metal plate is a zinc plated steel sheet.

3. Metal sheet coated with fluorocarbon polymer coating compound as set forth in claim 1, wherein said metal sheet is an aluminum sheet.

4. Metal sheet coated with fluorocarbon polymer coating compound as set forth in claim 1, wherein said metal sheet is a stainless steel sheet.

5. Metal sheet coated with fluorocarbon polymer coating compound as set forth in claim 1, wherein said glass fiber has a diameter of 1 to 30 $\mu$ and a length of 1 to 200$\mu$.

6. Metal sheet coated with fluorocarbon polymer coating compound as set forth in claim 5, wherein 1 to 60 parts by weight of said glass fibers are incorporated into 100 parts of said coating composition forming said outer coat.

7. Metal sheet coated with fluorocarbon polymer coating composition as set forth in claim 1, wherein said metal plate is an aluminum-zinc alloy plated sheet steel.

8. A metal sheet coated with the fluorocarbon polymer coating compound as set forth in claim 7, wherein the metal sheet is treated with a primer solution containing 15 to 60% by weight of a chromate compound prior to coating the metal sheet with said fluorocarbon polymer coating compound.

9. Fluorocarbon polymer coating composition for metal surfaces comprising:
    a coating solution consisting essentially of a fluorocarbon polymer and
    glass fibers dispersed in said coating composition, said glass fibers being prepared through the process of firstly treating said glass fiber with a first sizing solution of a titanate coupling agent and subsequently treating thus-sized glass fibers with a second sizing solution of a silane coupling agent.

10. Fluorocarbon polymer coating composition as set forth in claim 9, wherein said glass fiber has a diameter of 1 to 30 $\mu$ and a length of 1 to 200$\mu$.

11. Fluorocarbon polymer coating compound as set forth in claim 1, wherein 1 to 60 parts by weight of said glass fibers are blended with 100 parts by weight of said coating composition.

12. Fluorocarbon polymer coating composition as set forth in claim 9, wherein said fluorocarbon polymer is polyvinylidene fluoride.

13. Process of preparing a glass fiber reinforced fluorocarbon polymer coating composition for metal surfaces comprising the steps of:

immersing glass fibers in a first sizing solution of a titanate coupling agent and a solvent thereof and evaporating the solution in order to obtain the glass fibers of which surface are treated by the titanate-coupling agent;

subsequently immersing thus sized glass fibers in a second sizing solution of a silane coupling agent and a solvent thereof and evaporating the solution in order to obtain the glass fibers of which surface are sized with the titanate and silane coupling agents; and dispersing the resulting glass fibers into a coating composition consisting essentially of a fluorocarbon polymer and a solvent thereof to obtain said glass fiber contained fluorocarbon polymer coating composition.

* * * * *